(12) United States Patent
Lin et al.

(10) Patent No.: US 7,821,579 B2
(45) Date of Patent: Oct. 26, 2010

(54) IMAGE ENHANCING SYSTEM

(75) Inventors: Ping-Heng Lin, Taipei (TW);
Hao-Chun Chung, Taipei (TW);
Fu-Chung Chi, Taipei (TW)

(73) Assignee: Alcor Micro, Corp., Taipei (TW)

( * ) Notice: Subject to any disclaimer, the term of this patent is extended or adjusted under 35 U.S.C. 154(b) by 1149 days.

(21) Appl. No.: 11/478,652

(22) Filed: Jul. 3, 2006

(65) Prior Publication Data
US 2007/0009170 A1    Jan. 11, 2007

(30) Foreign Application Priority Data
Jul. 5, 2005    (TW) ............................. 94122707 A

(51) Int. Cl.
*H04N 5/21* (2006.01)
*H04N 5/57* (2006.01)

(52) U.S. Cl. ..................... 348/607; 348/625; 348/687

(58) Field of Classification Search ............... 348/606, 348/607, 624, 625, 628–630, 687, 673; 382/254, 382/260, 263, 264, 266, 270, 274, 275; 358/3.26, 358/3.27; 345/611; *H04N 5/21, 5/57*
See application file for complete search history.

(56) References Cited

U.S. PATENT DOCUMENTS

2004/0131117 A1 * 7/2004 Sheraizin et al. ............ 348/607

* cited by examiner

*Primary Examiner*—Sherrie Hsia
(74) *Attorney, Agent, or Firm*—Birch, Stewart, Kolasch & Birch, LLP

(57) ABSTRACT

An image enhancing system uses a perfect reconstructing filter to process image signals within a specified resolution and enhance the image signals. The image enhancing system includes an image-signal-obtaining unit, a first-signal-group processing unit, a high-pass/low-pass-image obtaining unit, a brightness-adjusting unit, a threshold unit, an amplifying unit, an adder and a normalizing unit. The image-signal-obtaining unit obtains nine image signals from three lines of image signals. The first-signal-group processing unit processes the nine image signals. The high-pass/low-pass-image obtaining unit obtains a high-frequency image signal and a low-frequency image signal. The brightness-adjusting unit adjusts the brightness of the low-frequency image signal. The threshold unit processes the noise of the high-frequency image signal. The amplifying unit amplifies the high-frequency image signal. The adder adds the high-frequency image signal and the low-frequency image signal. The normalizing unit normalizes the result of the adder to obtain an enhanced image.

15 Claims, 6 Drawing Sheets

|   |   |   |
|---|---|---|
| 1 | 2 | 1 |
| 2 | 4 | 2 |
| 1 | 2 | 1 |

FIG. 4A

|    |    |    |
|----|----|----|
| -1 | -2 | -1 |
| 2  | 4  | 2  |
| -1 | -2 | -1 |

FIG. 4B

|    |   |    |
|----|---|----|
| -1 | 2 | -1 |
| -2 | 4 | -2 |
| -1 | 2 | -1 |

FIG. 4C

|    |    |    |
|----|----|----|
| 1  | -2 | 1  |
| -2 | 4  | -2 |
| 1  | -2 | 1  |

FIG. 4D

IMAGE ENHANCING SYSTEM

BACKGROUND OF THE INVENTION

1. Field of the Invention

The present invention relates to an image enhancing system. In particular, this invention uses a perfect reconstructing filter to process image signals within a specified resolution, and enhance the image signals.

2. Description of the Related Art

Because video products have been become more popular and common over the last several decades, people can now enjoy beautiful images with excellent sound. The quality of the image is an important factor for image products. The sensing system for obtaining the image and the display system for displaying the image, are the decisive factors that determine the quality of the image. Both systems require an image processing system to make an image clearer and more vivid.

The most common method of achieving the above mentioned goal is to use a variety of filters to process the image. For example, a low pass filter is used for eliminating image noise and a high pass filter is used for enhancing the details of the image. Thereby, the user can obtain a superior image.

FIG. 1 shows a flow chart of the image processing method of the prior art. Firstly, a low pass filter 10 is used for eliminating noise of the image. Secondly, a high pass filter 12 processes the image processed by the low pass filter 10. Thirdly, a gain control unit 14 is used for enhancing the details of the image. Finally, an adder 16 is used for adding the signals processed by the low pass filter 10 and the signals processed by gain control unit 14 to obtain a final image with good quality.

The low pass filter can be a GAUSS filter or a mean-value filter. The high pass filter can be an edge-detection filter, such as a Sobel filter. The conventional image processing method needs to compromise between enhancing the details of the image and eliminating noise of the image. For example, if the noise of the image is eliminated to too great a degree, the high pass filter cannot recover details of the image. If not enough of the noise of the image is eliminated, the high pass filter amplifies the noise and the quality of the recovery image is poor.

Although the quality of the image processed by the multi-resolution filter can be enhanced, the processes required for the calculation are complex. It requires a lot of calculation processes and needs a large mass of memory.

SUMMARY OF THE INVENTION

One particular aspect of the present invention is to provide an image enhancing system. The image enhancing system uses a perfect reconstructing filter that is able to process the image within a single resolution at a time to enhance the image. The image enhancing system uses fewer calculation processes and less memory than the prior art to improve the quality of the image.

The image enhancing system includes an image-signal-obtaining unit, a first-signal-group processing unit, a high-pass/low-pass-image obtaining unit, a brightness-adjusting unit, a threshold unit, an amplifying unit, an adder and a normalizing unit. The image-signal-obtaining unit obtains nine pieces of image signals from three lines of image signals that are inputted continuously. The first-signal-group processing unit processes the nine pieces of image signals into a first-group image signals according to the filters. The high-pass/low-pass-image obtaining unit obtains a high-frequency image signal and a low-frequency image signal via a filter that is composed of high-pass filters and low-pass filters. The brightness-adjusting unit adjusts the brightness of the low-frequency image signal. The threshold unit processes the noise of the high-frequency image signal. The amplifying unit amplifies the high-frequency image signal. The adder adds the high-frequency image signal and the low-frequency image signal that has been processed. The normalizing unit normalizes the result of the adder to obtain an enhanced image.

The method for enhancing the image of the present invention includes obtaining nine pieces of the image by processing three lines of image signals that are inputted continuously, obtaining a first-group image signals by processing the nine pieces of the image according to the low-pass filters and high-pass filter, obtaining a high-frequency image signal from the first-group image signals according to the coefficient of the high-pass filter, obtaining a low-frequency image signal from the first-group image signals according to the coefficient of the low-pass filter, eliminating the noise of the high-frequency image signal and enhancing the details of the high-frequency image signal, adjusting the brightness of the low-frequency image signal and adding the high-frequency image signal and the low-frequency image signal that has been processed to obtain an enhanced image.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows:

FIGS. 4A, 4B, 4C and 4D are schematic diagrams of the high-pass/low-pass filters of the image enhancing system of the present invention;

DETAILED DESCRIPTION OF THE PREFERRED EMBODIMENTS

Figure 1:
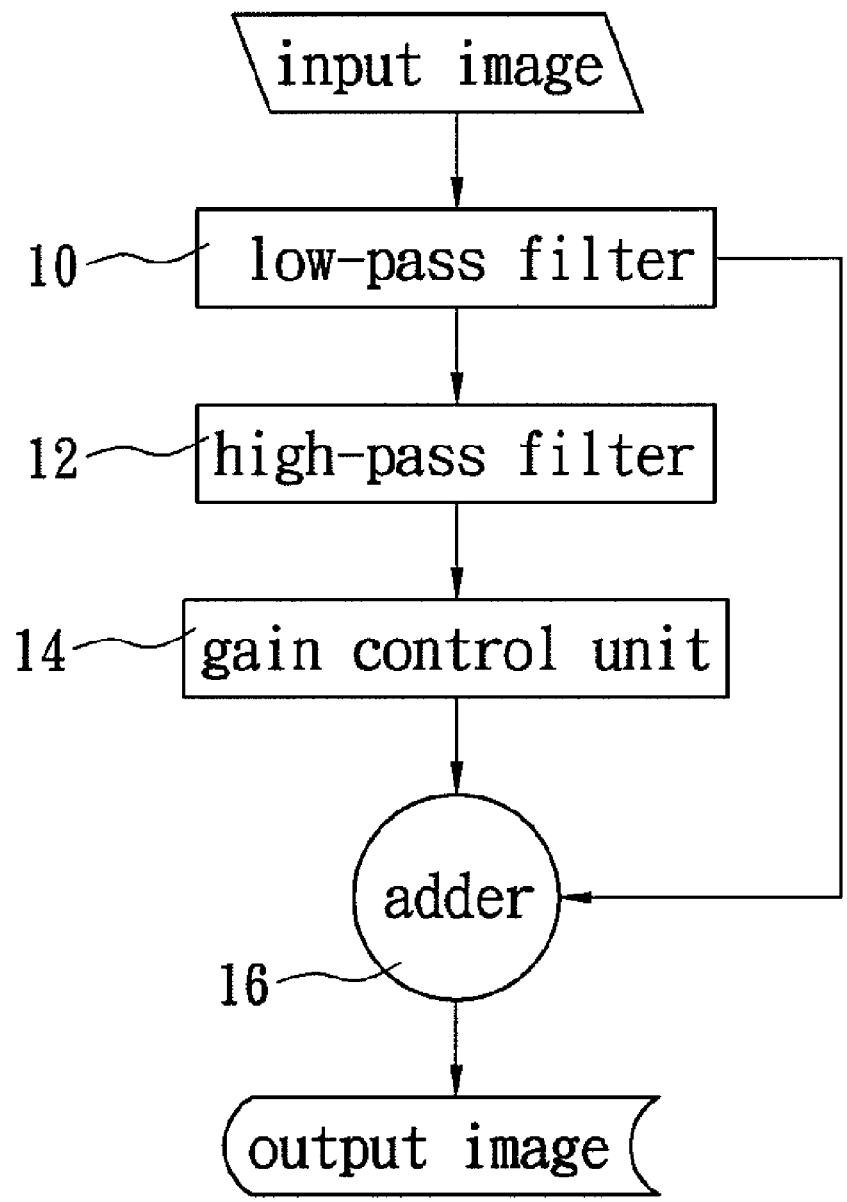
FIG. 1 is a flow chart of the image processing method of the prior art.
Figure 2:
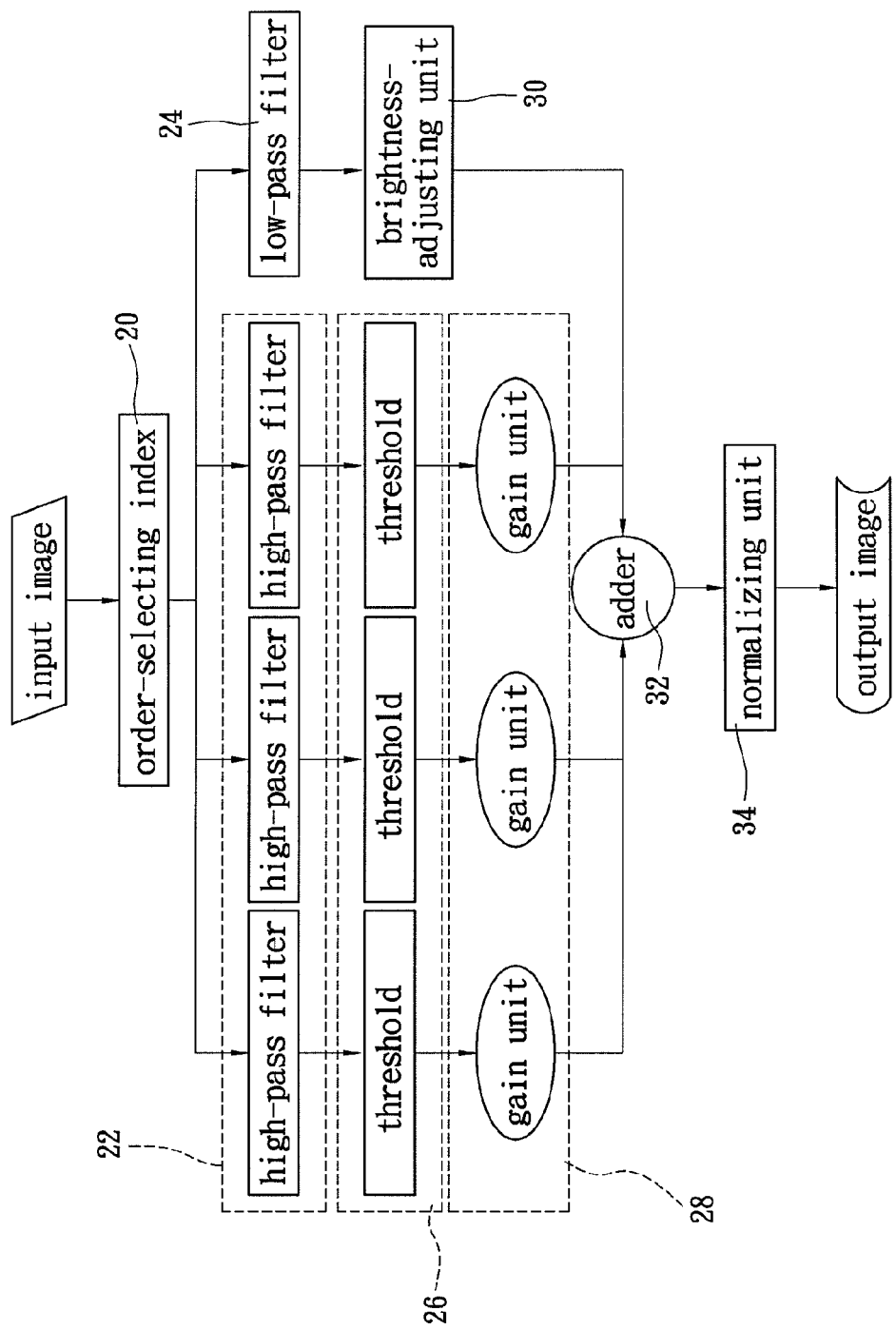
FIG. 2 is a schematic diagram of the image enhancing system of the present invention.

FIG. 2 shows a schematic diagram of the image enhancing system of the present invention. The image enhancing system includes an order-selecting index 20, a high-pass filter 22, a low-pass filter 24, a threshold 26, a gain unit 28, a brightness-adjusting unit 30, an adder 32 and a normalizing unit 34. The order-selecting index 20 selects the order of the imaging process. The image enhancing system can process the image process directly in any order, so that the calculation process for enhancing the image can be simplified and the time required for making the calculation can be reduced. The high-pass filter 22 and the low-pass filter 24 connect with the order-selecting index 20 for obtaining a high-frequency image signal and a low-frequency image signal from the input image. The threshold 26 connects with the high-pass filter 22 for processing the noise of the high-frequency image signal. The gain unit 28 connects with the threshold 26 for enhancing the details of the high-frequency image signal. The brightness-adjusting unit 30 connects with the low-pass filter 24 for adjusting the brightness of the low-frequency image signal. The adder 32 connects with the gain unit 28 and the brightness-adjusting unit 30 for adding the high-frequency image signal and the low-frequency image signal. The normalizing unit 34 connects with the adder 32 for normalizing the image output from the adder 32 to obtain an enhanced image.

In the present embodiment, there are three high-pass filters 22 and one low-pass filter 24. FIGS. 4A, 4B, 4C and 4D show the coefficient of the high-pass filters 22 and the low-pass filter 24. The number and the coefficient of the filters can be changed according the specifications of the image enhancing system. The number of the threshold units 26 and the gain units 28 are same as the number of the high-pass filters 22.

Figure 3:
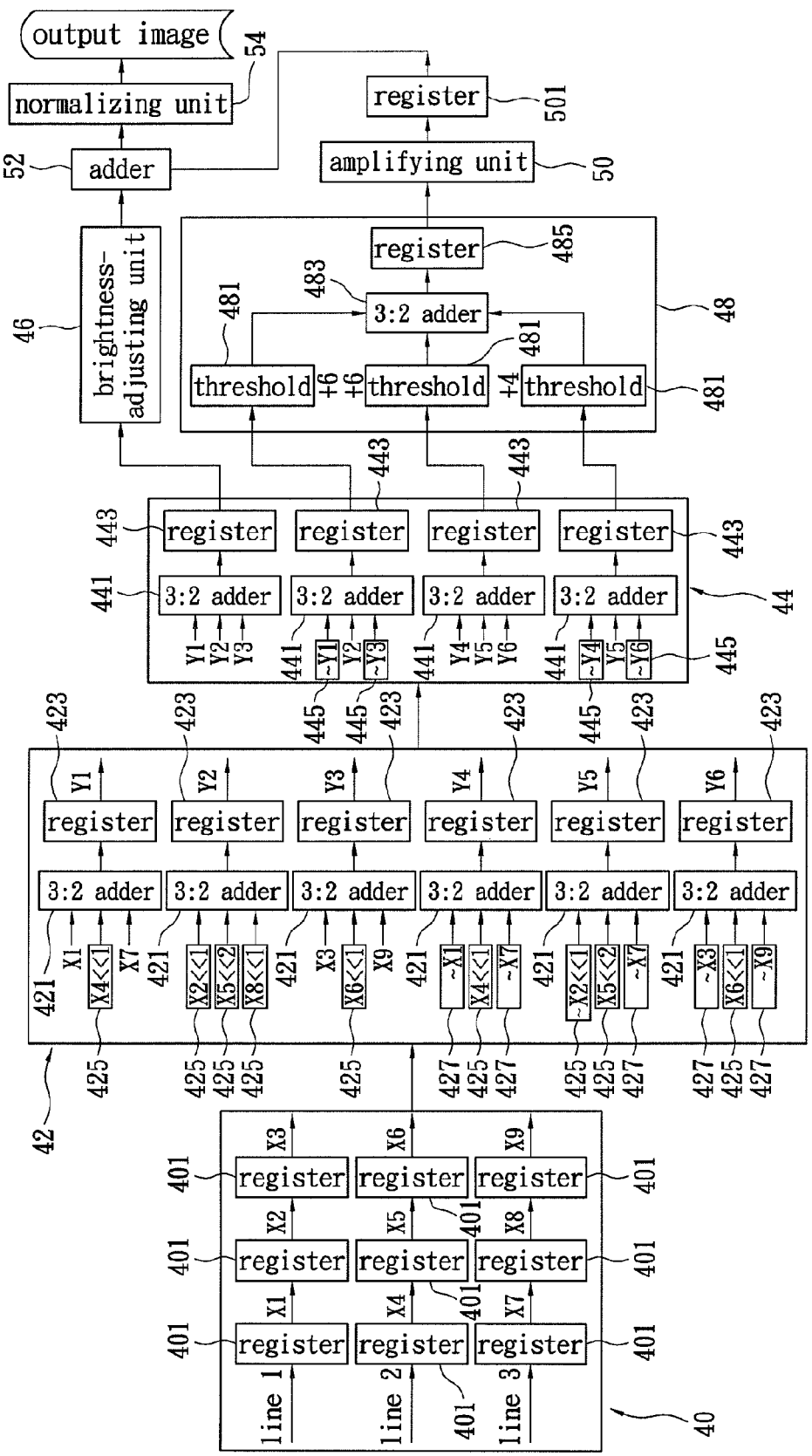
FIG. 3 is a schematic diagram of the circuit block of the image enhancing system of the present invention.

FIG. 3 shows a schematic diagram of the circuit block of the image enhancing system of the present invention. The image enhancing system includes an image-signal-obtaining unit 40, a first-signal-group processing unit 42, a high-pass/low-pass-image obtaining unit 44, a brightness-adjusting unit 46, a threshold unit 48, an amplifying unit 50, an adder 52 and a normalizing unit 54. The image-signal-obtaining unit 40 obtains nine pieces of image signals from three lines of image signals that are inputted continuously. The image-signal-obtaining unit 40 includes a plurality of registers 401. The first-signal-group processing unit 42 connects with the image-signal-obtaining unit 40. The first-signal-group processing unit 42 processes the nine pieces of image signals into a first-group image signals according to the filters. The first-signal-group processing unit 42 includes a plurality of shifters 425, a plurality of inverters 427, a plurality of 3:2 adders 421 and a plurality of registers 423. The 3:2 adder 421 is composed of a 3:2 carry saver adder and a carry lookahead adder.

The high-pass/low-pass-image obtaining unit 44 connects with the first-signal-group processing unit 42. The high-pass/low-pass-image obtaining unit 44 obtains a high-frequency image signal and a low-frequency image signal via a filter that is composed of high-pass filters and low-pass filters. The high-pass/low-pass-image obtaining unit 44 includes a plurality of inverters 445, a plurality of 3:2 adders 441 and a plurality of registers 443.

The brightness-adjusting unit 46 connects with the high-pass/low-pass-image obtaining unit 44. The brightness-adjusting unit 46 adjusts the brightness of the low-frequency image signal. The brightness-adjusting unit 46 requires two operation periods for each calculation. The brightness-adjusting unit 46 also can be implemented by two registers.

The threshold unit 48 connects with the brightness-adjusting unit 46. The threshold unit 48 processes the noise of the high-frequency image signal. The threshold unit 48 includes a plurality of thresholds 481, a 3:2 adder 483 and a register 485. The values of the threshold unit 48 are 6, 6 and 4 for canceling out the difference between the values that are caused by replacing the subtracter with an inverter.

The amplifying unit 50 connects with the threshold unit 48. The amplifying unit 50 amplifies the high-frequency image signal. The amplifying unit 50 further comprises a register 501. The adder 52 connects with the amplifying unit 50 and the brightness-adjusting unit 46. The adder 52 combines the high-frequency image signal and the low-frequency image signal that have been processed. The normalizing unit 54 connects with the adder 52. The normalizing unit 54 normalizes the result of the adder to obtain an enhanced image.

The processing flow of the image enhancing system is described below. Firstly, the image enhancing system uses nine registers to store the image signals X1, X2, X3, X4, X5, X6, X7, X8 and X9. The image signals come from three continuous image lines. Secondly, the image enhancing system uses the 3:2 adders 421, the shifters 425 and the inverters 427 to add the image signals and obtain the first image signal groups. The formulas are Y1=X1+2*X4+X7, Y2=2*X2+4*X5+2*X8, Y3=X3+2*X6+X9, Y4=~X1+2*X4+(~X7), Y5=2*(~X2)+4*X5+2*(~X8) and Y6=~X3+2*X6+(~X9). Thirdly, the image enhancing system uses the 3:2 adders 441 and the inverters 445 to add the first image signal groups and obtain the low-frequency image signal and the high-frequency image signals. The formulas are Y1+Y2+Y3, (~Y1)+Y2+(~Y3), Y4+Y5+Y6 and (~Y4)+Y5+(~Y6). The second, third and fourth results are different from the exact result. The difference is 6, 6 and 4. The reason for this is that the image enhancing system uses the inverter to replace the subtracter. The difference value can be compensated at the threshold 481. The method shifts the threshold value by 6, 6 and 4. Fourthly, the high-frequency image signals pass through the threshold 481 to eliminate the high-frequency noise. The high-frequency image signals are then added together and amplified by the amplifying unit 50. Finally, the image enhancing system adds the high-frequency image signal and the low-frequency image signal to obtain the enhanced image.

The image enhancing system uses 3:2 adders 421 and 441 to obtain the first image signal groups, the low-frequency image signal and the high-frequency image signals. Wherein the combination of the shifters, the inverters and the 3:2 adders depends on the number and the parameters of the high-pass filter and the low-pass filter.

Figure 5A:
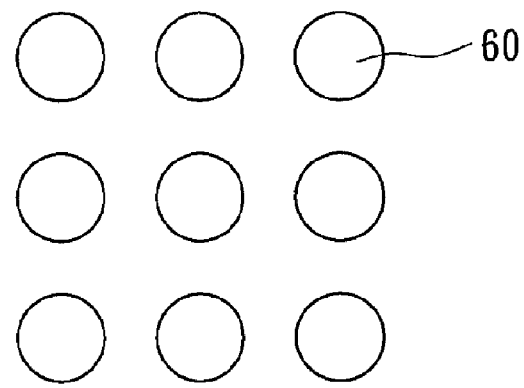
FIG. 5A is a schematic diagram for obtaining an image signal when the image enhancing system of the present invention is used in a first order process.
Figure 5B:
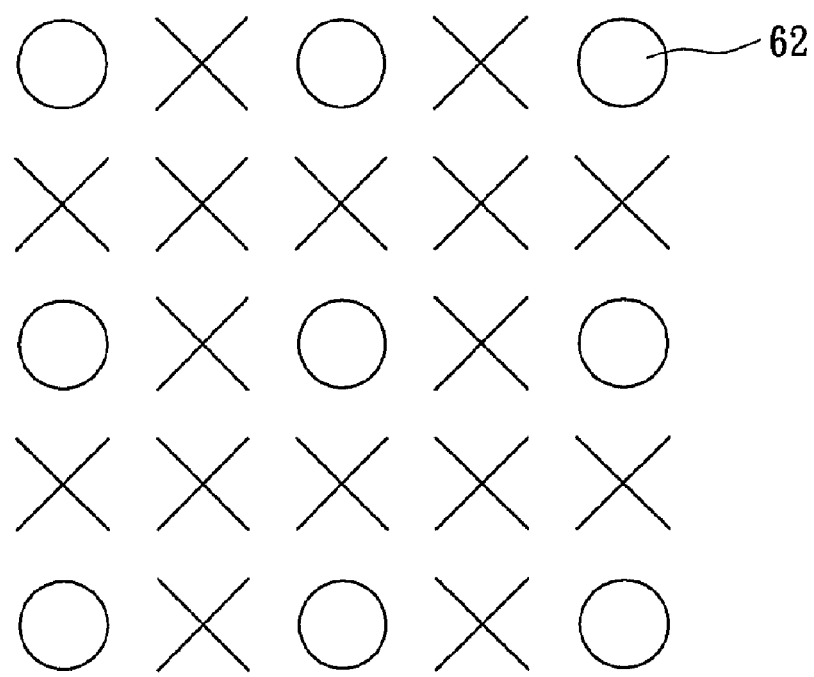
FIG. 5B is a schematic diagram for obtaining image signal when the image enhancing system of the present invention is used in a second order process.

The image enhancing system further includes the order-selecting index 20. The order-selecting index 20 connects with the image-signal-obtaining unit 40. The order-selecting index 20 selects the order of the image process. The image enhancing system can process the image process directly in any order, so that the calculation process for enhancing the image is simplified and the calculation time is reduced. FIG. 5A shows a schematic diagram of obtaining image signal when the image enhancing system of the present invention is operated in a first order process. FIG. 5B shows a schematic diagram of obtaining image signal when the image enhancing system of the present invention is operated in a second order process. The image enhancing system uses the methods shown in FIGS. 5A and 5B to obtain the image signals 60 and 62. Next, the image enhancing system uses the order-selecting index 20 to select the order of the image process. Thereby, the image enhancing system can process the image process directly in any order, so that the calculation process for enhancing the image is simplified and the calculation time is reduced.

If the threshold unit 48 is 0, the amplifying unit 50 is 1 and the brightness-adjusting unit 46 is 1, then the enhanced image produced by the high-pass filter and the low-pass filter that is shown in FIGS. 4A, 4B, 4C and 4D is a prefect reconstructed image. By using the high-pass filter and the low-pass filter, the image enhancing system can obtain the true image and can process the image signals within a specified frequency. The calculation time is thereby reduced and the amount of memory required is also reduced.

Figure 6:
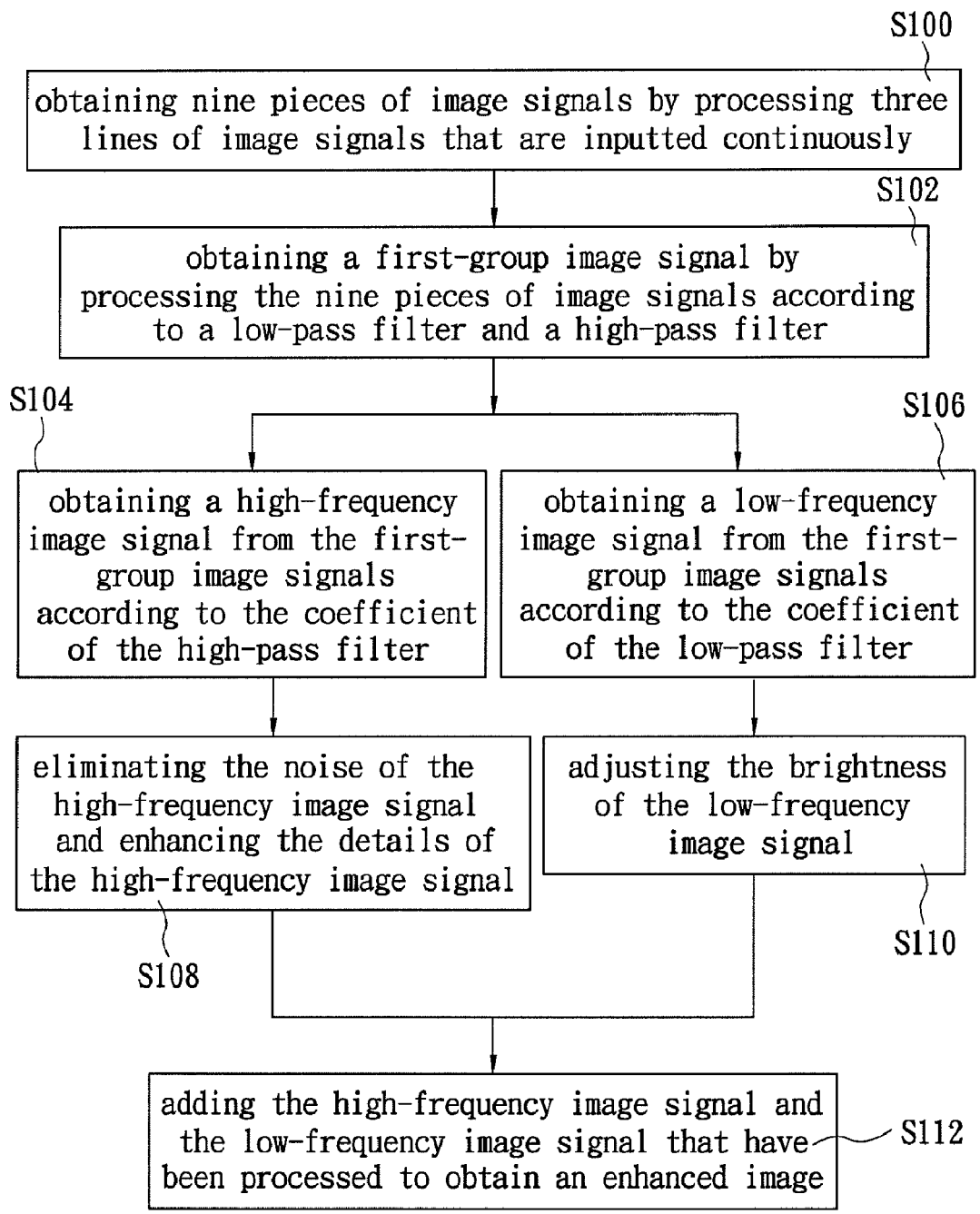
FIG. 6 is a flow chart of the method for enhancing the image of the present invention.

FIG. 6 shows a flow chart of the method for enhancing the image of the present invention. The steps includes obtaining nine pieces of image signals by processing three lines of image signals that are inputted continuously (S100), obtaining a first-group image signals by processing the nine pieces of image signals according to a low-pass filter and a high-pass filter (S102), obtaining a high-frequency image signal from the first-group image signals according to the coefficient of the high-pass filter (S104), obtaining a low-frequency image signal from the first-group image signals according to the coefficient of the low-pass filter (S106), eliminating the noise of the high-frequency image signal and enhancing the details of the high-frequency image signal (S108), adjusting the brightness of the low-frequency image signal (S110) and adding the high-frequency image signal and the low-frequency image signal that have been processed to obtain an enhanced image (S112).

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. An image enhancing system, comprising:
   an image-signal-obtaining unit, for obtaining nine pieces of image signals from three lines of image signals that are inputted continuously;
   a first-signal-group processing unit connecting with the image-signal-obtaining unit, for processing the nine pieces of image signals into a first-group image signals;
   a high-pass/low-pass-image obtaining unit connecting with the first-signal-group processing unit, for obtaining a high-frequency image signal and a low-frequency image signal via a filter that is composed of high-pass filters and low-pass filters;
   a brightness-adjusting unit connecting with the high-pass/low-pass-image obtaining unit, for adjusting the brightness of the low-frequency image signal;
   a threshold unit connecting with the high-pass/low-pass-image obtaining unit, for processing the noise of the high-frequency image signal;
   an amplifying unit connecting with the threshold unit, for amplifying the high-frequency image signal;
   an adder connecting with the amplifying unit and the brightness-adjusting unit, for adding the high-frequency image signal and the low-frequency image signal that has been processed; and
   a normalizing unit connecting with the adder, for normalizing the results of the adder to obtain an enhanced image.

2. The image enhancing system as claimed in claim 1, further comprising an order-selecting index connecting with the image-signal-obtaining unit, for selecting the order of the image process, thereby the image enhancing system processes the image process directly in any order and the calculation process for enhancing the image is simplified and the calculation time is reduced.

3. The image enhancing system as claimed in claim 1, wherein the image-signal-obtaining unit comprises a plurality of registers.

4. The image enhancing system as claimed in claim 1, wherein the first-signal-group processing unit comprises a plurality of shifters, a plurality of inverters, a plurality of 3:2 adders and a plurality of registers.

5. The image enhancing system as claimed in claim 4, wherein the 3:2 adder is composed of a 3:2 carry saver adder and a carry lookahead adder.

6. The image enhancing system as claimed in claim 1, wherein the high-pass/low-pass-image obtaining unit comprises a plurality of inverters, a plurality of 3:2 adders and a plurality of registers.

7. The image enhancing system as claimed in claim 6, wherein the 3:2 adder is composed of a 3:2 carry saver adder and a carry lookahead adder.

8. The image enhancing system as claimed in claim 1, wherein the brightness-adjusting unit takes two operation periods for calculation.

9. The image enhancing system as claimed in claim 1, wherein the brightness-adjusting unit comprises two registers.

10. The image enhancing system as claimed in claim 1, wherein the threshold unit comprises a plurality of thresholds, a 3:2 adder and a register.

11. The image enhancing system as claimed in claim 10, wherein the 3:2 adder is composed of a 3:2 carry saver adder and a carry lookahead adder.

12. The image enhancing system as claimed in claim 1, wherein the values of the threshold unit are modified for canceling out the difference between the values that are caused by replacing the subtracter with an inverter.

13. The image enhancing system as claimed in claim 1, wherein the high-pass/low-pass-image obtaining unit comprises a low-pass filter and three high-pass filters.

14. An image enhancing system, comprising:
   an order-selecting index, for selecting the order in which the images are processed, thereby the image enhancing system processes the image process directly in any order and the calculation process for enhancing the image is simplified and the calculation time is reduced;
   a high-pass filter connecting with the order-selecting index, for obtaining a high-frequency image signal;
   a low-pass filter connecting with the order-selecting index, for obtaining a low-frequency image signal;
   a threshold unit connecting with the high-pass filter, for processing the noise of the high-frequency image signal;
   an amplifier connecting with the threshold, for amplifying the high-frequency image signal;
   a brightness-adjusting unit connecting with the low-pass filter, for adjusting the brightness of the low-frequency image signal;
   an adder connecting with the amplifier and the brightness-adjusting unit, for adding the high-frequency image signal and the low-frequency image signal that have been processed; and
   a normalizing unit connecting with the adder, for normalizing the result of the adder to obtain an enhanced image.

15. A method for enhancing the image, comprising:
   obtaining nine pieces of the image signals by processing three lines of image signals that are inputted continuously;
   obtaining a first-group image signals by processing the nine pieces of the image according to a low-pass filter and a high-pass filter;
   obtaining a high-frequency image signal from the first-group image signals according to the coefficient of the high-pass filter;
   obtaining a low-frequency image signal from the first-group image signals according to the coefficient of the low-pass filter;
   eliminating the noise of the high-frequency image signal and enhancing the details of the high-frequency image signal;
   adjusting the brightness of the low-frequency image signal; and
   adding the high-frequency image signal and the low-frequency image signal that have been processed to obtain an enhanced image.

* * * * *